(12) United States Patent
Zimmer

(10) Patent No.: US 6,662,400 B1
(45) Date of Patent: Dec. 16, 2003

(54) DEVICE FOR DRIVING A WIPER ARM

(75) Inventor: Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 430 days.

(21) Appl. No.: 09/787,574

(22) PCT Filed: Jul. 19, 2000

(86) PCT No.: PCT/DE00/02349

§ 371 (c)(1),
(2), (4) Date: Mar. 19, 2001

(87) PCT Pub. No.: WO02/05614

PCT Pub. Date: Jan. 24, 2002

(30) Foreign Application Priority Data

Jul. 29, 1999 (DE) .......................... 199 33 615

(51) Int. Cl.⁷ .................................................. B60S 1/34
(52) U.S. Cl. ................................ 15/250.21; 15/250.31; 15/250.352
(58) Field of Search ......................... 15/250.21, 250.23, 15/250.3, 250.31, 250.33, 250.351, 250.352

(56) References Cited

U.S. PATENT DOCUMENTS

| | | | |
|---|---|---|---|
| 4,683,605 A | 8/1987 | Leroy et al. | |
| 5,623,742 A | 4/1997 | Journee | |
| 6,314,607 B1 * | 11/2001 | Kinoshita | ................ 15/250.21 |
| 2003/0024064 A1 * | 2/2003 | Heinrich et al. | ......... 15/250.21 |

FOREIGN PATENT DOCUMENTS

| | | | |
|---|---|---|---|
| DE | 42 24 861 A | | 2/1994 |
| WO | WO 96/22204 | * | 7/1996 |
| WO | WO 99/42346 | * | 8/1999 |

* cited by examiner

*Primary Examiner*—Terrence R. Till
(74) *Attorney, Agent, or Firm*—Michael J. Striker

(57) ABSTRACT

The invention is based on a device for driving a wiper arm, having a lever mechanism (10) which has a drive lever (14), pivotable about a drive axis (12), and a drop arm (18) pivotable about an axis (16), wherein the drive lever (14) and the drop arm (18) are connected to one another via hinges (22, 24) by means of a coupling rod (20), which carries a fastening part (34) of the wiper arm.

Figure 1:
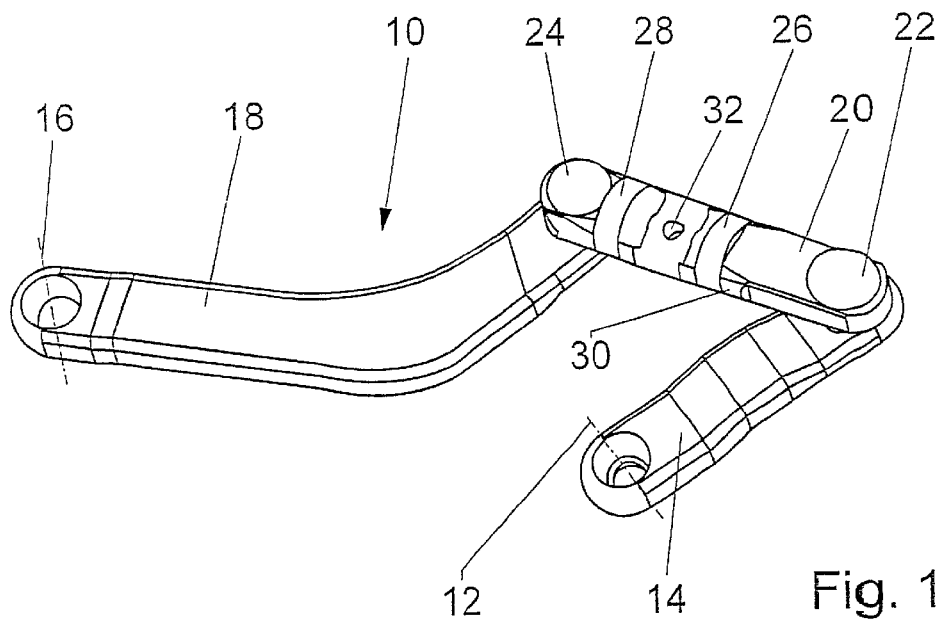

It is proposed that the fastening part (34) is separably fastened to the coupling rod (20) and can be adjusted relative to the coupling rod (20) about a displacement axis (38), extending in the longitudinal direction, in a displacement region (40).

18 Claims, 6 Drawing Sheets

DEVICE FOR DRIVING A WIPER ARM

PRIOR ART

The invention is based on a device for driving a wiper arm as generically defined by the preamble to claim 1.

Wiper systems with a plurality of windshield wipers for motor vehicles are fastened with their wiper bearings to the vehicle body directly or indirectly via a mounting plate. The mounting plate or a tubular mounting plate—if the wiper carrier also has tubular hollow profiles—includes a motor mounting plate, which has a wiper drive mechanism with a wiper motor and a gear mounted on it. A power takeoff shaft of the gear is supported in a gear dome and, as a rule via a crank and connecting rods, drives further cranks, which are connected solidly to one drive shaft for each windshield wiper.

It is also possible for the drive shaft of the wiper motor to drive a four-bar lever mechanism. The four-bar lever mechanism has a drive lever, which is seated pivotably on a drive axis and is connected pivotably via a coupling rod to a drop arm. The drop arm is seated pivotably on a stationary shaft. A fastening part of a wiper arm is integrally formed onto the coupling rod and together with it forms a so-called four-bar wiper lever, to which the hinge part of the wiper arm is fastened via a foldaway hinge. The drive lever can be driven directly by a power takeoff shaft of the wiper motor or via a crank and connecting rods. It can also be embodied as a cross lever. The kinematics of the four-bar lever mechanism produce a combined reciprocating and swiveling motion of the windshield wiper. As a result, the windshield wiper is better able to follow the angular contour of a vehicle window.

A wiper blade with a support bracket system and a wiper strip is pivotably connected to the wiper arm. For a good outcome of wiping and to avoid chattering, it is important that the wiper strip with its wiper lip be guided over the vehicle window at a certain approach angle. Although the production tolerances of the individual, numerous components of the windshield wiper and its drive mechanism are only slight, still the sum of the tolerances, together with those of the fastening to the vehicle body and of the vehicle body itself, is so great that an optimal approach angle is not assured in mass production. While the wiper systems, because of their high ratio of length to width, are well oriented crosswise to the vehicle direction, poor orientation results above all in the longitudinal direction of the vehicle.

ADVANTAGES OF THE INVENTION

According to the invention, the fastening part is separably fastened to the coupling rod and can be adjusted relative to the coupling rod about a displacement axis, extending in the longitudinal direction, in a displacement region. As a result, the fastening part and with it the wiper arm with its wiper blade can be adjusted about its longitudinal axis, so that the wiper strip during assembly is given its optimal approach angle to the windshield, regardless of production tolerances of the vehicle.

The coupling rod is expediently screwed to the fastening part between the hinges and, in the axial direction on both sides of the fastening position, has guide faces, on which the fastening part rests. As a result, the bending forces that are transmitted from the wiper blade to the fastening part are favorably absorbed by the coupling part. To keep the pressure per unit of surface area between the guide faces and support faces low, it is advantageous that numerous guide faces, which produce a wide support spacing in the longitudinal direction, are provided. Expediently, the guide faces are distributed circumferentially to the displacement axis over a region of more than 180°, so that they can absorb bending forces in all directions. For that purpose, guide faces that are located on the side walls of the coupling part can be utilized.

To make the fastening part pivotable about a longitudinal axis, the guide faces comprise parts of the jacket faces of bodies generated by rotation that are coaxial with the displacement axis, and the displacement axis expediently extends inside the coupling rod. Since the approach angle of the wiper strip is meant to be changed by the displacement, it is advantageous if the displacement axis extends as parallel as possible to an associated wiper blade. The vertical position of the wiper arm, and in particular the vertical position of the fastening part, in the region of the foldaway hinge, to the windshield should not vary, or should vary only slightly. This is achieved by providing that the displacement axis intersects the hinge axis of the foldaway hinge, or has the slightest possible spacing from the hinge axis.

The fastening part expediently surrounds the coupling rod with a U-shaped profile open toward the coupling rod and is connected to the coupling rod between the hinges, at the transverse wall of the U-shaped profile. The U-shaped profile is resistant to bending and allows a wide variety of variation, so that guide faces can be disposed over a large area between the coupling part and the fastening part. In the region of the fastening position, the transverse wall of the U-shaped profile of the fastening part has a bulge toward the open side of the U shaped profile, and this bulge engages a corresponding indentation of the coupling rod. The opposed walls of the bulge and indentation are designed such that they allow a displacement. They can also be called guide faces.

Fastening elements in the form of screws, screw nuts, threaded bolts and threaded stubs find space in the bulge without protruding past the outer contour of the fastening part. As a result, in a further feature of the invention, a cap, preferably of plastic, can cover the fastening position by being slipped onto the coupling rod. This averts the risk that in the motion of the coupling rod, parts will become caught between it and the levers pivotably connected to it. For reasons of appearance and streamlining, it is expedient that the fastening part, in the region of the connection point of the cap, has a step which is approximately equivalent to the thickness of the material of the cap, so that the outer contour of the cap adjoins the outer contour of the fastening part flush with it.

The adjustment serves the purpose above all of correcting for production tolerances. To prevent the fastening part from being roughly assembled wrong or shifting arbitrarily if the screw fastening should come loose, it is expedient that the displacement region is limited, for instance to an angular range of less than 5°, and preferably to 3°. This purpose is served by stops between the fastening part and the coupling rod, or between the elements that are solidly connected to these parts.

To enable an infinitely graduated displacement, the guide faces are smooth, or for better frictional engagement are roughened. By means of a fluting in the longitudinal direction parallel to the displacement axis, an incremental displaceability is attained. This is advantageous so that the adjustment from an outset position can be done in defined angular increments.

DRAWING

Further advantages will become apparent from the ensuing description of the drawings. In the drawing, exemplary embodiments of the. invention are shown. The drawing, specification and claims include numerous characteristics in combination. One skilled in the art will expediently consider the characteristics individually as well and put them together to make useful further combinations.

Figure 2:
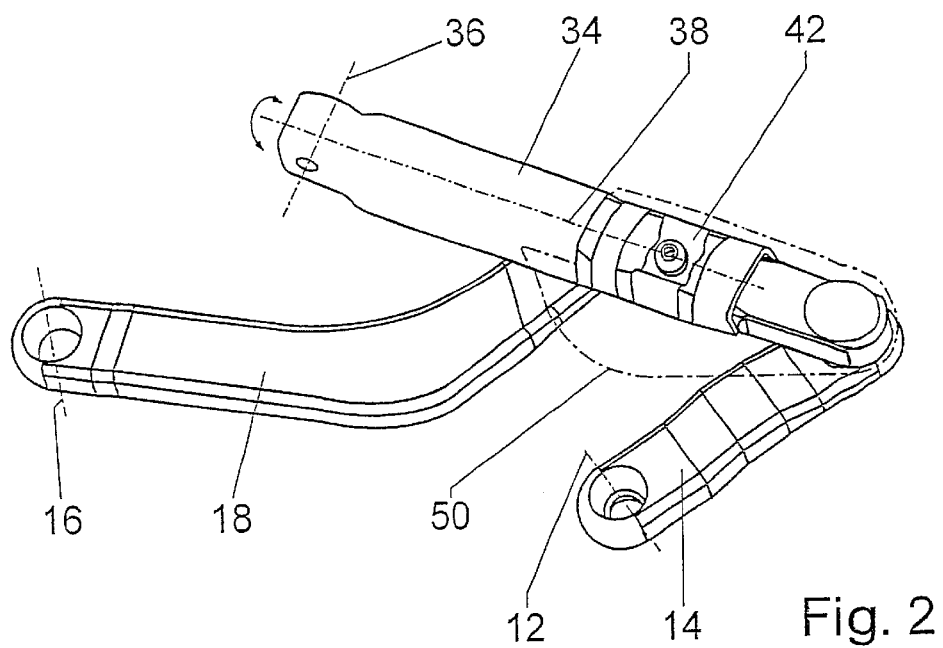
Figure 3:
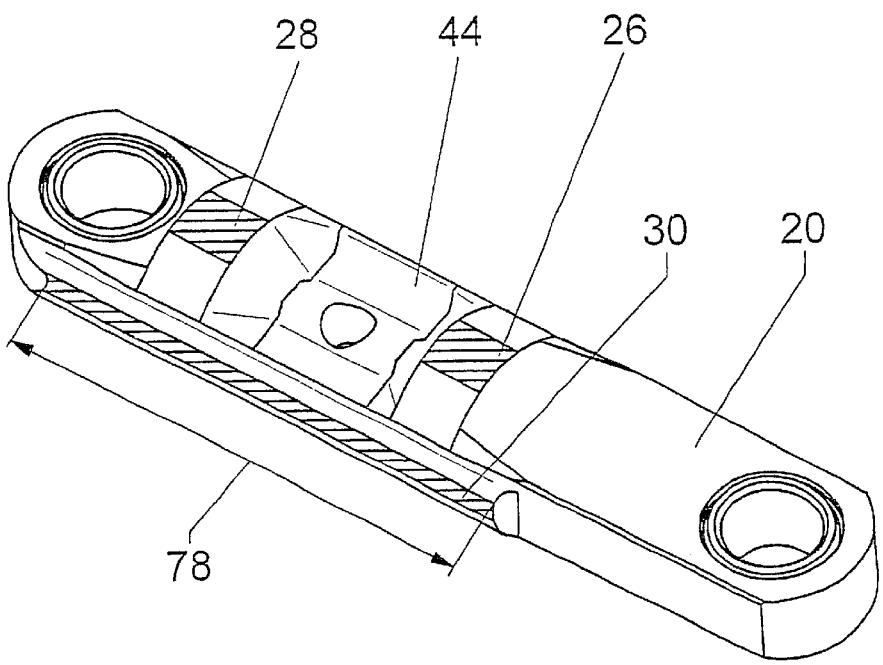
Figure 4:
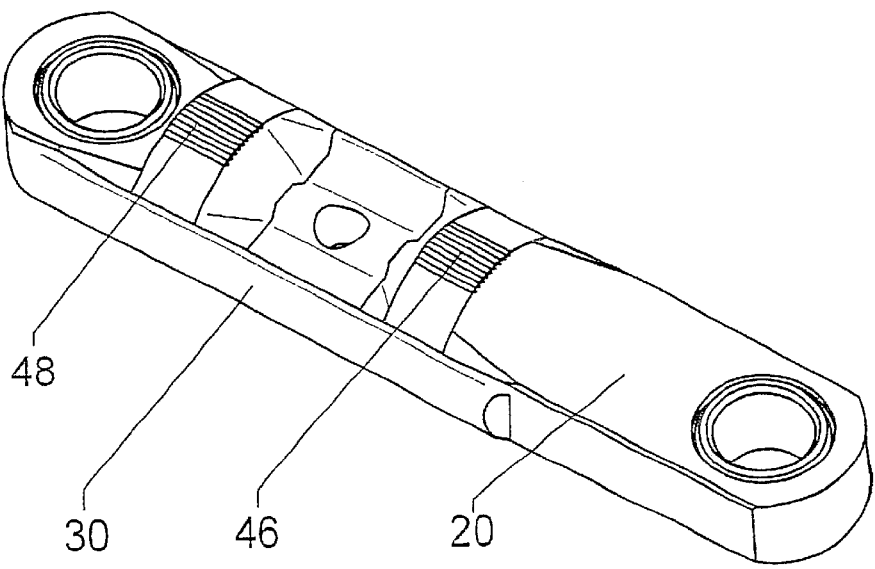
Figure 5:
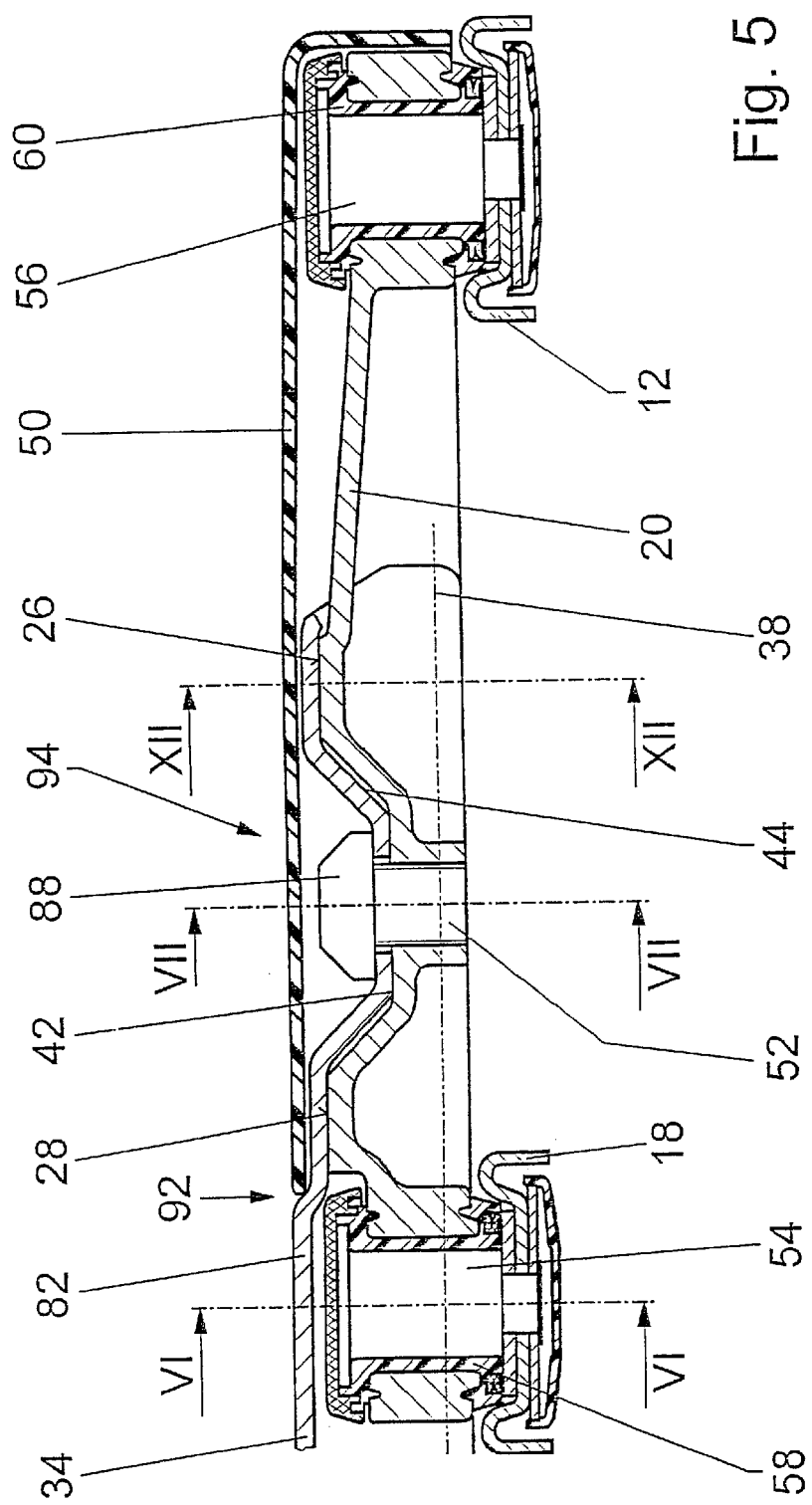
Figure 6:
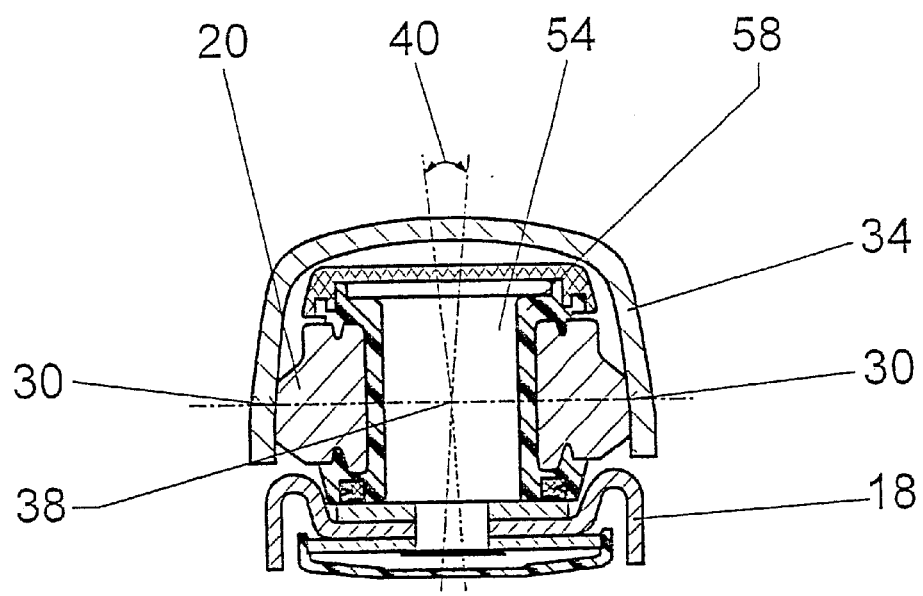
Figure 7:
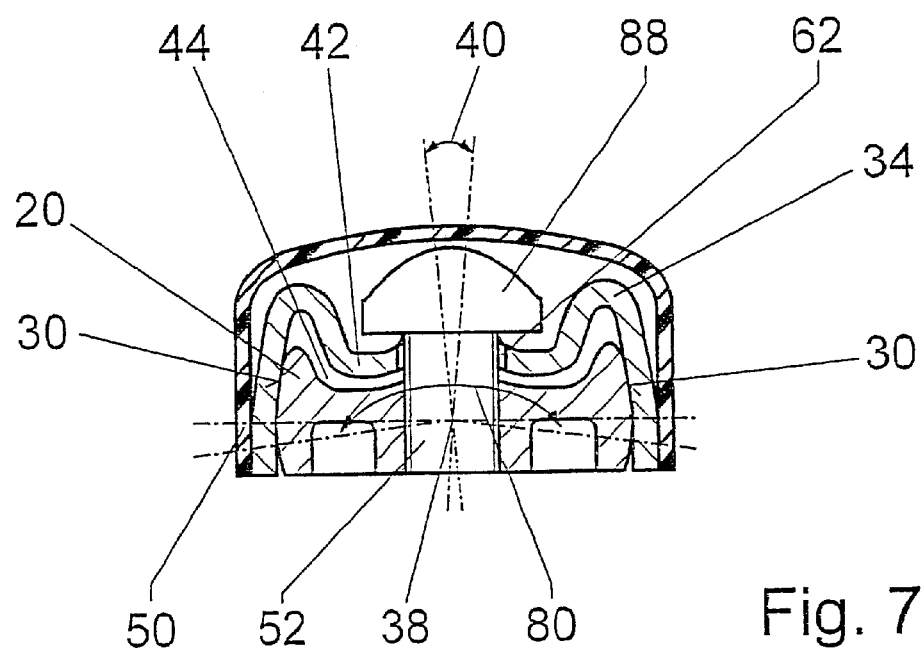
Figure 8:
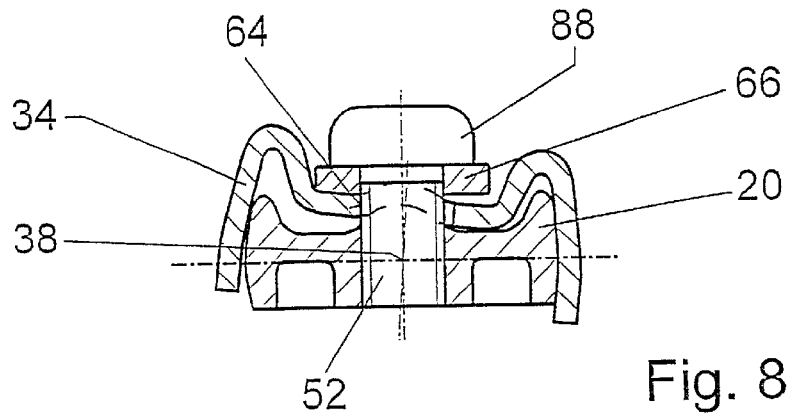

Shown are:

FIG. 1, a detail of a lever mechanism;

FIG. 2, a lever mechanism of FIG. 1 with a fastening part;

FIG. 3, a perspective view of a coupling rod;

FIG. 4, a variant of FIG. 3;

FIG. 5, a longitudinal section through a coupling rod with a fastening part and a cover cap;

FIG. 6, a section taken along the VI—VI in FIG. 5;

FIG. 7, a section taken along the VII—VII in FIG. 5;

FIGS. 8–11, Variants of FIG. 7; and

Figure 12:
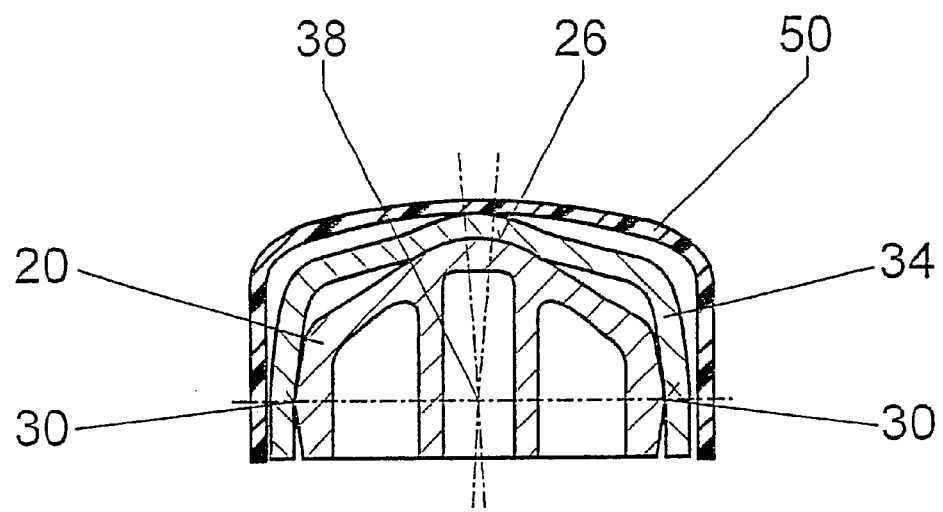

FIG. 12, a section taken along the XII—XII in FIG. 5.

DESCRIPTION OF THE EXEMPLARY EMBODIMENTS

The lever mechanism 10 shown in FIG. 1 includes a drive lever 14, which is supported rotatably about a drive axis 12; a drop arm 18, which is supported rotatably about an axis 16; and a coupling rod 20, which is connected via hinges 22, 24 to the drive lever 14 on one end and to the drop arm 18 on the other end. The drive axis 12 and the axis 16 are disposed on a vehicle body, not shown further, directly or indirectly via a mounting plate. The hinges 22, 24 are formed by hinge pins 54, 56, which are supported in the coupling rod 20 via bearing shells 58, 60 (FIGS. 5, 6) and are riveted to the drop arm 18 and the drive lever 14, respectively.

A fastening position 94 for a fastening part 34 is located between the hinges 22 and 24. The fastening part has a U-shaped profile, open toward the coupling rod 20, with which it surrounds the coupling rod 20 on three sides. In the region of the fastening position 94, the coupling rod 20 has an indentation 44 on the upper side, and a bulge 42 of the transverse wall 82 of the fastening part 34 engages this indentation. The fastening part 34 is fastened to the coupling rod 20 by at least one screw connection. In the versions of FIG. 1, FIG. 2, FIG. 5, FIG. 7 and FIG. 8, the screw connection is formed by a threaded hole 32 in the coupling rod 20 and by a screw 52, whose screw head 88 rests directly on a curved face of the fastening part 34 or indirectly on the fastening part 34 via a formed disk 66 (FIG. 8) and presses the fastening part 34 against the coupling rod 20. It is also possible for a plurality of screw connections to be provided, preferably one after the other in the direction of the displacement axis 38.

In the axial direction of the coupling rod 20, there are guide faces 26, 28 on both sides of the screw connection 32, 52, and the fastening part 34 is braced on these guide faces. The guide faces 26, 28 are formed by partial faces of bodies generated by rotation that are located coaxially to a displacement axis 38, so that the fastening part 34 can be rotated about the displacement axis 38 and calibrated. The displacement axis 38 extends substantially in the longitudinal direction of the fastening part 34 and thus parallel to a wiper blade, which is not further shown but has a wiper strip and is pivotably connected to the fastening part 34 via a wiper bearing and a hinge part by means of a foldaway hinge. A hinge axis of the foldaway hinge is identified by reference numeral 36 (FIG. 2).

In order for the bending forces that the wiper blade transmits to the fastening part 34 to be carried favorably onto the coupling rod 20, the guide faces 26, 28 have a suitably great axial spacing and a sufficiently large contact area, so that the pressure per unit of surface area resulting from the bending forces is slight, compared to the pressure per unit of surface area resulting from the locking forces. The guidance and retention of the fastening part 34 can be improved by further guide faces 30 on the sides of the coupling rod 20, which further guide faces have a considerable axial length and thus form a wide support spacing 78. The guide faces 26, 28, 30 are expediently disposed about the displacement axis 38 in such a way that they encompass a region 80 of more than 180° (FIG. 7). As a result, even forces exerted from below can be braced via guide faces 26, 38, 30 on the coupling rod 20.

To enable infinitely variable adjustment of the fastening part 34, the guide faces 26, 28, 30 are smooth, or for better force transmission are roughened (FIG. 3). A version shown in FIG. 4 has guide faces 46, 48, which are fluted parallel to the displacement axis 38. As a result, beginning at a given position, it is possible to make the adjustment in small, predetermined angular increments. The adjustment of the fastening part 34 serves to optimize the approach angle of the wiper strip to the windshield. For this purpose, a relatively small displacement region 40, which amounts to less than 5°, preferably being 3°, suffices. The displacement region 40 is limited by stops 64, which are disposed between the fastening part 34 and the coupling rod 20, or between parts that are connected to them, for instance between a through hole 62 and a threaded bolt 68, or between a formed disk 66 and the fastening part 34, or other suitable parts of the fastening part 34 and the coupling rod 20.

Figure 9:
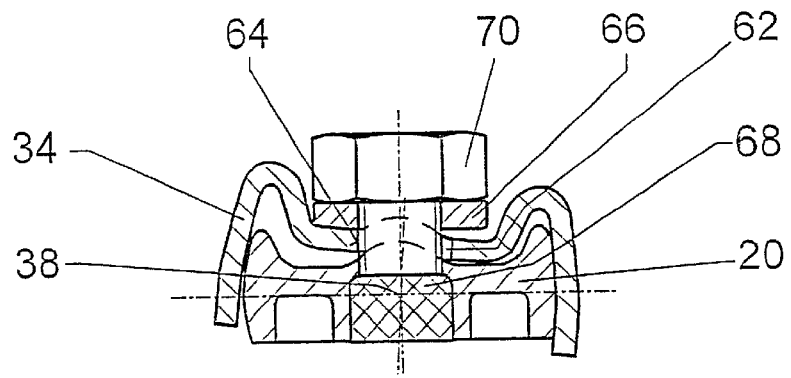
Figure 10:
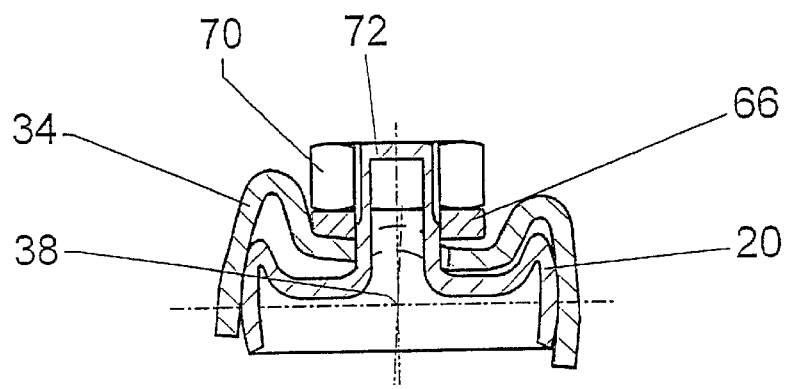
Figure 11:
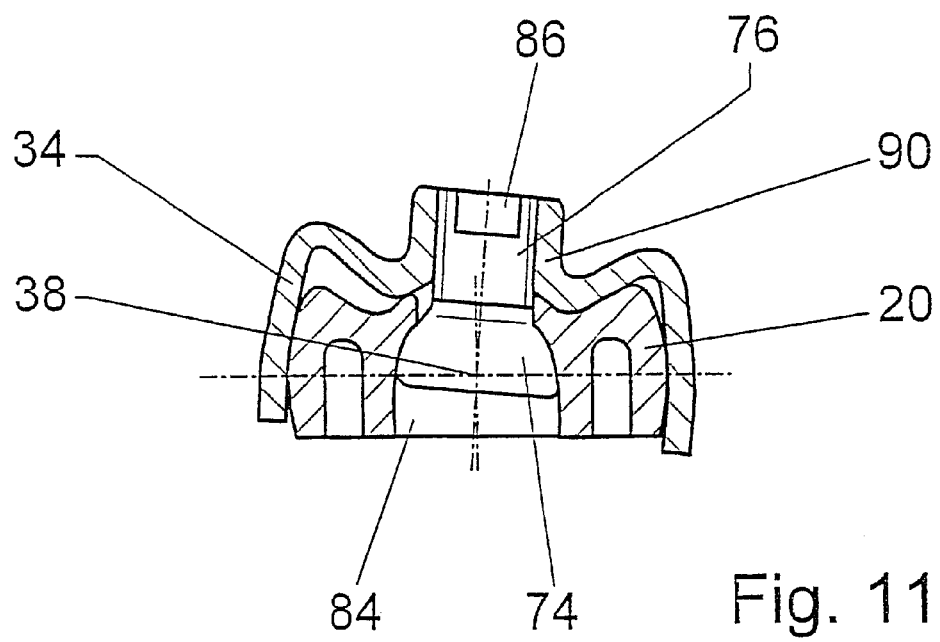

The screw connection between the fastening part 34 and the coupling rod 20 can be embodied in various ways. FIG. 9 shows a threaded bolt 68 that is integrally cast or press-fitted into the coupling rod 20 and onto which a screw nut 70 is screwed, which via a formed disk 66 presses the fastening part 34 against the guide faces 26, 28, 30, 46, 48. The version of FIG. 10 differs from this in that instead of the threaded bolt 68, a threaded stub 72, onto which the screw nut 70 is screwed, is integrally formed onto a coupling rod 20 made as a deep-drawn sheet-metal part. Finally, FIG. 11 shows a variant in which the coupling rod 20 has a spherical recess 84, into which a threaded bolt 76 is inserted with a ball head 74; the threaded bolt 76 is screwed into a threaded stub 90 of the fastening part 34. This purpose is served by a hexagonal socket 86 on a face end of the threaded bolt 76.

The screw connections shown are located inside the bulge 42 of the fastening part 34, so that they do not protrude past the outer contour of the fastening part 34. They are expediently covered with a cap 50, which is slipped onto the coupling rod 20 (FIG. 5) and extends past the fastening position 94 into the region of the hinges 22, 24. This lessens the risk of anything becoming caught in wiper operation within the range of motion of the coupling rod 20 and the drop arm 18 or the drive lever 14. This prevents injuries and damage. The fastening part 34, in an attachment region 92, has a step which is adjoined flush on the outside by the contour of the cap 50.

List of Reference Numerals

10 Lever mechanism
12 Drive axis
14 Drive lever
16 Axis
18 Drop arm
20 Coupling rod 22 Hinge
24 Hinge
26 Guide face
28 Guide face
30 Guide face
32 Threaded hole
34 Fastening part
36 Hinge axis
38 Displacement axis
40 Displacement region
42 Bulge
44 Indentation
46 Guide face
48 Guide face
50 Cap
52 Screw
54 Threaded bolt
56 Threaded bolt
58 Bearing shell
60 Bearing shell
62 Through hole
64 Stop
66 Formed disk
68 Threaded bolt
70 Screw nut
72 Threaded stub
74 Ball head
76 Threaded bolt
78 Support spacing
80 Region
82 Transverse wall
84 Recess
86 Hexagonal socket
88 Screw head
90 Threaded stub
92 Attachment region
94 Fastening position

What is claimed is:

1. A device for driving a wiper arm, having a lever mechanism (10) which has a drive lever (14), pivotable about a drive axis (12), and a drop arm (18) pivotable about an axis (16), wherein the drive lever (14) and the drop arm (18) are connected to one another via hinges (22, 24) by means of a coupling rod (20), which carries a fastening part (34) of the wiper arm, characterized in that the fastening part (34) is separably fastened to the coupling rod (20) and can be adjusted relative to the coupling rod (20) about a displacement axis (38), extending in the longitudinal direction, in a displacement region (40).

2. The device of claim 1, characterized in that the coupling rod (20) is screwed to the fastening part (34) between the hinges (22, 24) and, in the axial direction on both sides of the fastening position (94), has guide faces (26, 28, 30, 46, 48), on which the fastening part (34) rests, and the guide faces (26, 28, 30, 46, 48) comprise parts of the jacket faces of bodies generated by rotation that are coaxial with the displacement axis (38), and the displacement axis (38) extends inside the coupling rod (20).

3. The device of claim 1, characterized in that the displacement axis (38) extends as parallel as possible to an associated wiper blade.

4. The device of claim 1, characterized in that the displacement axis (38) extends at the slightest possible spacing from a hinge axis (36) of a foldaway hinge.

5. The device of claim 1, characterized in that the fastening part (34) is fastened to the coupling rod (20) by a screw connection (32, 52; 68, 72 and 70), and a formed disk (66) is provided between a screw head (88) or a screw nut (70) and the fastening part (34).

6. The device of claim 1, characterized in that the guide faces (26, 28, 30, 46, 48) have a wide support spacing (78) in the longitudinal direction of the coupling rod (20), and in the circumferential direction relative to the displacement axis (38), they encompass a region (80) of more than 180°.

7. The device of claim 1, characterized in that the fastening part (34) surrounds the coupling rod (20) with a U-shaped profile open toward the coupling rod (20) and is connected to the coupling rod (20) between the hinges (22, 24), at the transverse wall (82) of the U-shaped profile.

8. The device of claim 7, characterized in that the transverse wall (82) of the fastening part (34) has a bulge (42) in the region of the fastening position (94) toward the open side of the U-shaped profile, which bulge engages a corresponding indentation (44) in the coupling rod (20).

9. The device of claim 8, characterized in that at least one guide face (26, 28, 46, 48) is provided in the longitudinal direction in the vicinity of the bulge (42) or indentation (44).

10. The device of claim 1, characterized in that the guide faces (26, 28, 46, 48) are roughened or are fluted in the longitudinal direction.

11. The device of claim 1, characterized in that the coupling rod (20) has at least one integrally cast or press-fitted threaded bolt (68).

12. The device of claim 1, characterized in that the coupling rod (20) is a deep-drawn sheet-metal part with at least one integrally formed-on threaded stub (72).

13. The device of claim 1, characterized in that the coupling rod (20) has a spherical recess (84) with an opening for receiving a threaded bolt (76) with a ball head (74) and a hexagonal socket (86), and the threaded bolt (76) is screwed into a threaded stub (90) of the fastening part (34).

14. The device of claim 1, characterized in that at least one stop (64) limits the displacement region (40).

15. The device of claim 14, characterized in that the screw head (88), the formed disk (66), or a through hole (62) for the screw (52), the threaded bolt (68) or the threaded stub (72) forms the stop (64).

16. The device of claim 14, characterized in that the displacement region (40) is less than 5°, and is preferably 3°.

17. The device of claim 1, characterized in that the coupling rod (20) has a cap (50), which covers the fastening position (94) between the coupling rod (20) and the fastening part (34) and/or the adjoining region of the hinges (22, 24).

18. The device of claim 17, characterized in that the fastening part (34), in the attachment region (92), has a step, which is adjoined flush on the outside by the contour of the cap (50).

* * * * *